United States Patent
Kobayashi et al.

(10) Patent No.: US 6,220,139 B1
(45) Date of Patent: *Apr. 24, 2001

(54) SAW BLADE

(75) Inventors: Mitsuo Kobayashi; Katsuhiro Horiguchi; Kousuke Tokuoka, all of Hyougo-Ken (JP)

(73) Assignee: Amada Company, Limited, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,001

(22) PCT Filed: Mar. 8, 1996

(86) PCT No.: PCT/JP96/00568
§ 371 Date: Sep. 8, 1997
§ 102(e) Date: Sep. 8, 1997

(87) PCT Pub. No.: WO96/27470
PCT Pub. Date: Sep. 12, 1996

(30) Foreign Application Priority Data

Mar. 8, 1995 (JP) .................................................... 7-048271

(51) Int. Cl.$^7$ .................................................... B27B 13/02

(52) U.S. Cl. ................................ 83/835; 83/846; 83/848; 83/851; 83/852

(58) Field of Search ........................ 83/835, 846, 848–62, 83/661; 76/112

(56) References Cited

U.S. PATENT DOCUMENTS

| 3,367,216 | 2/1968 | Anderson et al. . | |
|---|---|---|---|
| 3,576,061 | 4/1971 | Pahlitzsch . | |
| 3,651,841 | 3/1972 | Ohlsson . | |
| 4,236,432 | * 12/1980 | Kawakami et al. | 83/848 |
| 4,802,396 | * 2/1989 | Kuklinski | 83/849 |
| 4,827,822 | * 5/1989 | Yoshida et al. | 83/835 |
| 4,958,546 | * 9/1990 | Yoshida et al. | 83/848 |
| 5,062,338 | * 11/1991 | Baker | 83/848 |
| 5,351,592 | * 10/1994 | Bloom | 83/835 |
| 5,410,935 | * 5/1995 | Holston et al. | 83/851 |
| 5,603,252 | * 2/1997 | Hayden, Sr. | 83/851 |
| 5,606,900 | * 3/1997 | Stoddard | 83/846 |

FOREIGN PATENT DOCUMENTS

| 726818 | * 10/1942 | (DE) | 83/846 |
|---|---|---|---|
| 1196745 | * 10/1967 | (GB) | 83/846 |
| 2 226 274 | * 6/1990 | (GB) | 83/846 |
| 54-45895 | 4/1979 | (JP) . | |
| 62-5730 | 1/1987 | (JP) . | |
| 62-28336 | 2/1987 | (JP) . | |
| 79158 | * 10/1949 | (NO) | 83/846 |

* cited by examiner

Primary Examiner—M. Rachuba
(74) Attorney, Agent, or Firm—Blank Rome Comisky & McCauley LLP

(57) ABSTRACT

A saw blade 1 comprises a preceding tooth 5 constructed by a straight tooth performing no saw setting operation in left-hand and right-hand directions and a succeeding tooth 7 for cutting a cutting groove formed by the above preceding tooth 5 to enlarge and open the cutting groove in width. The succeeding tooth 7 has left-hand and right-hand set teeth 7L, 7R bent in the left-hand and right-hand directions by splitting an approximately central portion 7D of a tooth edge on a tooth line in its thickness direction; and the clearance between end tip insides of the above left-hand and right-hand set teeth 7L, 7R is smaller than the thickness of the preceding tooth 5. Further, the thickness of portions of the left-hand and right-hand set teeth 7L, 7R near their end tip portions are approximately equal to the thickness of portions of the left-hand and right-hand set teeth near respective base portions thereof.

16 Claims, 17 Drawing Sheets

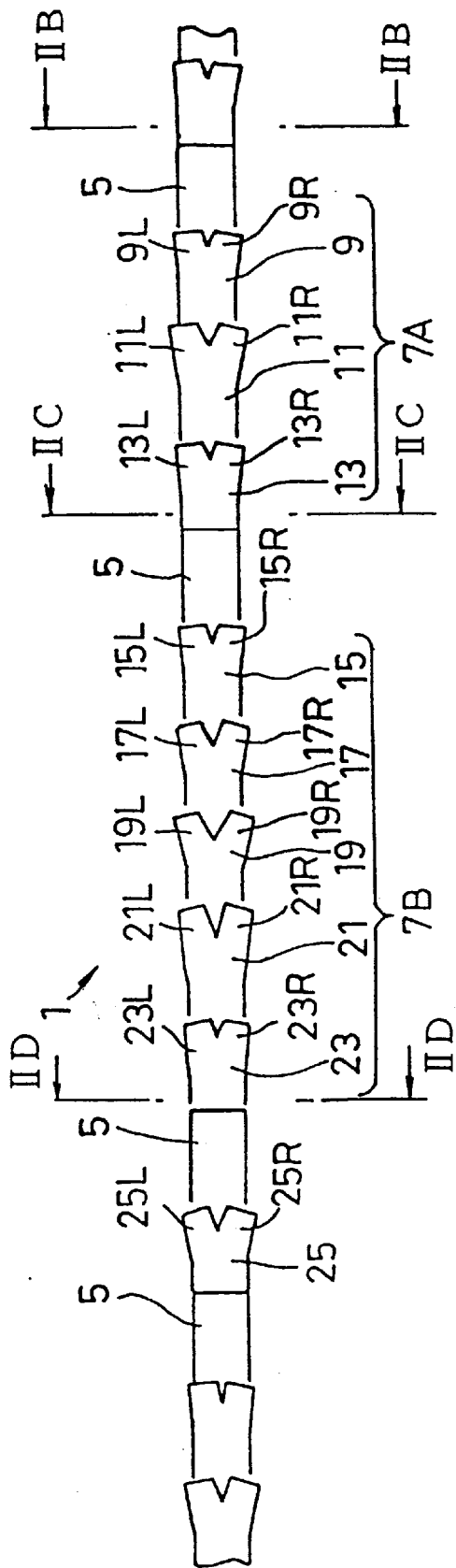
FIG. 2A
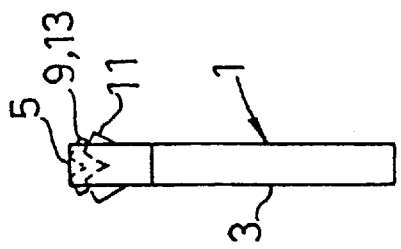
FIG. 2B
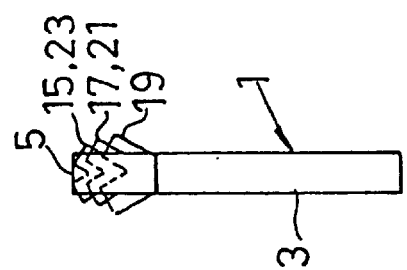
FIG. 2C
FIG. 2D

CUTTING GROOVE

V TYPE

U TYPE

CIRCULAR TYPE

CONVEX TYPE

CONCAVE TYPE

MULTIPLE STEPS TYPE

METHOD FOR SETTING IN THE LATERAL DIRECTION

A: CUTTING START POSITION
B: CUTTING END POSITION

TIME TO BE TAKEN FOR TRAVELLING FROM
POSITION A TO POSITION B: t (min)

$$\text{FEED AMOUNT (mm/min)} = \frac{D\,(mm)}{t\,(min)}$$
(CUTTING AMOUNT)

CUTTING DEVIATION AMOUNT

SAW BLADE

TECHNICAL FIELD

The present invention relates to a saw blade such as a band saw blade, a circular saw blade and the like. More particularly, the present invention relates to a saw blade having a straight tooth as a preceding tooth and a suitable number of succeeding teeth which enlarge and open a cutting groove formed by this straight tooth and have left-hand and right-hand set teeth formed in a left-hand and right-hand symmetrical shape by splitting an approximately central portion of each of tooth edge on a tooth line in a thickness direction thereof.

BACKGROUND ART

For example, a saw blade such as a band saw blade, a circular saw blade and the like, as shown in FIGS. 12(A) and 12(B), is conventionally known. Tn this saw blade, a straight tooth 101S, a left-hand set tooth 103L and a right-hand set tooth 103R are set to one group. In another conventional example of the saw blade, as shown in FIGS. 13(A) and 13(B), a straight tooth 105S, a left-hand set tooth 107L, a right-hand set tooth 107R, a left-hand set tooth 109L and a right-hand set tooth 109R are set to one group.

The left-hand set teeth 103L, 107L, 109L and the right-hand set teeth 103R, 107R, 109R in the respective saw blades are independently bent. As shown in FIG. 14, when a material W is cut by each of the saw blades, the left-hand set teeth 103L, 107L, 109L and the right-hand set teeth 103R, 107R, 109R prevent an interference of the material W with a body portion 111 in each of the saw blades.

However, since the left-hand set teeth 103L, 107L, 109L and the right-hand set teeth 103R, 107R, 109R in the respective saw blades are independently formed, the material W is cut by each of the saw blades vibrating leftward and rightward when each of the left-band set teeth 103L, 107L, 109L and the right-hand set teeth 103R, 107R, 109R cuts the material W. As shown in FIGS. 15A, 15B and 15C, a so-called ghost pattern 113 appears in a cutting plane of the material W cut by the cutting operation.

This phenomenon of vibration of each of the saw blades leftward and rightward particularly causes a problem in performing a heavy cutting operation. When a feed speed exceeds a certain limit, a wavy pattern 115 having an amount of waviness "a" occurs in the material W as shown in FIGS. 16A, 16B and 16C and may lead to a cutting deviation.

The left-hand and right-hand set teeth in each of the saw blades shown in FIGS. 12A, 12B and FIGS. 13A, 13B3 are shifted forward and backward in an advancing direction of each of the saw blades. Accordingly, the left-hand and right-hand set teeth are vibrated leftward and rightward with respect to this advancing direction so that the ghost pattern 113 occurs. Further, the wavy pattern 115 occurs in cutting operation for increasing a cutting amount. Accordingly, as a countermeasure for preventing each of the saw blades from being vibrated leftward and rightward, it is necessary to arrange such that that the left-hand and right-hand set teeth simultaneously cut the material while opposing to each other in the leftward and rightward direction.

A saw blade as shown in FIG. 17 is known as a dovetail type saw blade for simultaneously cutting the material leftward and rightward in this same tooth. Namely, in FIG. 17, the saw blade is constructed by a preceding tooth 117 and a succeeding tooth 119 having a dovetail shape. The preceding tooth 117 is set to a high tooth and the succeeding tooth 119 is set to a low tooth.

However, as shown in FIG. 17, a face d must be finished by polishing work to obtain a side face relief angle α' so that it takes much time to perform the polishing work. As shown in U.S. Pat. No. 3,576,061, a similar problem is also caused when an angle of inclination of a rake face is formed.

Further, a chain saw as shown in U.S. Pat. No. 3,367,216 is used to process wood, and a tooth edge of the chain saw is insufficient in strength to cut a metal. A saw blade as shown in U.S. Pat. No. 3,651,841 is also used for a wood material and an organic material (cork, rubber, bone and the like.). There is also a case in which this saw blade is used to cut a material. However, in this case, the strength of a tooth edge of the saw blade is also insufficient. In particular, this saw blade is not suitable for heavy cutting.

In a circular saw shown in each of Japanese published Utility Model (KOKOKU) No. 62-28336 and Japanese published Patent (KOKOKU) No. 62-5730, a tooth line is divided at the tooth line center of a tooth edge in its thickness direction and is perpendicular to a side face of a body portion. Chips produced during cutting is stored into gullets. When the chips are melted and attached to the saw, no chip is sufficiently removed from the saw by a chip removing apparatus (such as a wire brush, etc.) so that tooth edge chipping is caused by the melting attachment of the chips. Further, when a tooth edge of a preceding tooth is chipped, and wearing of a succeeding tooth having a groove in a tooth edge center portion progresses so that a cutting amount becomes greater than a depth of the tooth edge center groove of the succeeding tooth, no chip is divided and cutting resistance is increased and a melting attachment strength is also increased so that tooth edges are often chipped.

Further, in Japanese laid-open patent (KOKAI) No. 54-45895 as a prior example, a V-shaped groove is formed in a central portion of a tooth edge in a saw blade so that the tooth edge is divided into left-hand and right-hand portions and their end tip portions are projected from a body portion side face of the saw blade.

In this construction, the divided left-hand and right-hand tooth edge portions are sharpened so that a tooth edge strength is small and no material can be cut at all when the material is a metal.

An object of this invention is to provide a saw blade in which left-hand and right-hand set teeth in a succeeding tooth with respect to a preceding tooth can be bend quickly simultaneously in left-hand and right-hand directions and almost no ghost pattern is caused and no wavy pattern is caused during cutting operation, and a cutting deviation amount during cutting operation is small so that a stabler cutting operation can be performed.

DISCLOSURE OF THE INVENTION

In consideration of the above-mentioned problems, the invention of claim 1 resides in a saw blade comprising a preceding tooth constructed by a straight tooth unset in left-hand and right-hand directions and a succeeding tooth for cutting a cutting groove formed by the preceding tooth to enlarge and open the cutting groove in width, wherein the succeeding tooth has left-hand and right-hand set teeth bent in the left-hand and right-hand directions by splitting an approximately central portion of a tooth edge on a tooth line in its thickness direction, the clearance between end tip insides of the left-hand and right-hand set teeth is smaller than the thickness of the preceding tooth.

In the above construction, when a material is cut by the succeeding tooth, the left-hand and right-hand set teeth formed in the succeeding tooth simultaneously act on the material in the same place so that component forces in the left-hand and right-hand directions are opposed to each other and cancel each other. Thus, vibrations of the saw blade in the left-hand and right-hand directions can be effectively prevented. Therefore, there is almost no ghost pattern tending to be caused during cutting operation, and generation of a wavy pattern tending to be caused at the cutting time can be prevented.

Further, since the clearance between the end tip insides of the left-hand and right-hand set teeth of each succeeding tooth is smaller than the thickness of the preceding tooth, the uncut remaining portion left in a triangular shape between the above left-hand and right-hand set teeth is cut by each preceding tooth, so that a metallic material can be reliably cut.

In the invention of claim 2, the thickness of portions of the left-hand and right-hand set teeth near their end tip portions are approximately equal to the thickness of portions of the left-hand and right-hand set teeth near respective base portions thereof in the invention of claim 1. Accordingly, the left-hand and right-hand set teeth formned in the succeeding tooth approximately have an equal thickness over an entire length thereof and a tooth strength is large.

In other words, sectional shapes of the left-hand and right-hand set teeth are rectangular so that the strength of a tooth edge corner portion is easily maintained and a wear resistance property of the saw blade is improved. An amount of the change in the shape of the saw blade caused by cutting resistance during a heavy cutting is small and a heavy cutting operation can be efficiently performed.

In the invention of claim 3, plural succeeding teeth are formed such that a laterally projecting amount of each of the succeeding teeth is increased as each of heights of the succeeding teeth is reduced, The plural succeeding teeth are formed in the invention of claim 3 such that the laterally projecting amount of each of the succeeding teeth is increased as each of heights of the succeeding teeth is reduced. Accordingly, when the material is cut, no ghost pattern is almost caused and no wavy pattern is caused during the cutting, and a cutting deviation amount during the cutting is small so that a stabler cutting operation can be performed. When the number of succeeding teeth is set to be random, it is not necessary to perform left-hand and right-hand bending operation on the succeeding teeth in accordance with a predetermined rule. Accordingly, the left-hand and right-hand bending works can be simultaneously performed for a shorter time in comparison with polishing work. Further, cutting resistance can be dispersed to each tooth and reduced.

Further, since the clearance between the end tip insides of the left-hand and right-hand set teeth of each succeeding tooth is smaller than the thickness of the preceding tooth, the uncut remaining portion left in a triangular shape between the above left-hand and right-hand set teeth is cut by each preceding tooth so that a metallic material can be reliably cut.

In the invention of claim 4, T/2−0.1 mm≦A≦T/2+0.1 mm is satisfied when A is a size of the succeeding tooth in its parting position and T is a body thickness of the succeeding tooth.

In the invention of claim 5, the saw blade includes a succeeding tooth satisfying βL>0° and βR>0° when βL and βR are respectively inclination angles of tooth lines of the left-hand and right-hand set teeth in the succeeding tooth.

In the invention of claim 6, 20°≦θ≦90° is satisfied when θ is a split angle between the succeeding teeth.

In the claim 4, T/2−0.1 mm ≦A≦T/2+0.1 mm is satisfied when A is a size or the succeeding tooth in its split position and T is a body thickness of the succeeding tooth. In the claim 5, the saw blade includes a succeeding tooth satisfing βL>0° and βR>0° when βL and βR are respectively inclination angles of the left-hand and right-hand set teeth in the succeeding tooth on a tooth line. In the claim 6, 20°≦θ≦90° is satisfied when θ is a split angle between the succeeding teeth. Accordingly, when the material is cut, almost no ghost pattern is caused and no wavy pattern is caused during cutting, and a cutting deviation amount during cutting is small so that a stabler cutting operation can be performed.

BRIEF DESCRIPTION OF THE DRAWINGS

FIGS. 1A to 1C show a first embodiment of the present invention, in which FIG. 1A is a plan view showing one embodiment of a saw blade in this invention, FIG. 1B is a front view of FIG. 1A, and FIG. 1C is a side view taken along line 1C—1C of FIG. 1B.

FIGS. 2A to 2D show a second embodiment, in which FIG. 2A is a plan view showing another embodiment of a saw blade in this invention, and FIGS. 2B, 2C and 2D are side views respectively taken along lines B—B, C—C and D—D of FIG. 1A.

FIGS. 12A and 12B show a conventional saw blade in which FIG. 12A is a plan view showing the conventional saw blade and FIG. 12B is a side view of FIG. 2A.

FIGS. 13A and 13B show a conventional saw blade in which FIG. 13A is a plan view showing another conventional saw blade and FIG. 13B is a side view of FIG. 13A.

FIGS. 15A and 15C show a cutting plane of the material in which FIG. 15A is a perspective explanatory view showing the cutting plane of the material cut by cutting operation, and FIGS. 15B and 15C are views taken along lines XVB—XVB and XVC—XVC of FIG. 15A.

FIGS. 16A and 16C show a wavy shape formed in the material, in which FIG. 16A is a perspective explanatory view showing the wavy shape of the material in cross section cut by the cutting operation and FIGS. 16B and 16C are views taken along lines XVIB—XVIB and XVIC—XVIC of FIG. 16A.

BEST MODE FOR CARRYING OUT OF THE INVENTION

Embodiments of this invention will next be explained in detail with reference to the drawings.

Figure 1A:
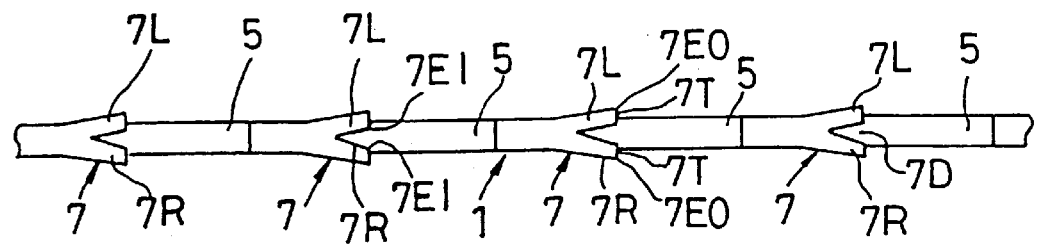
Figure 1B:
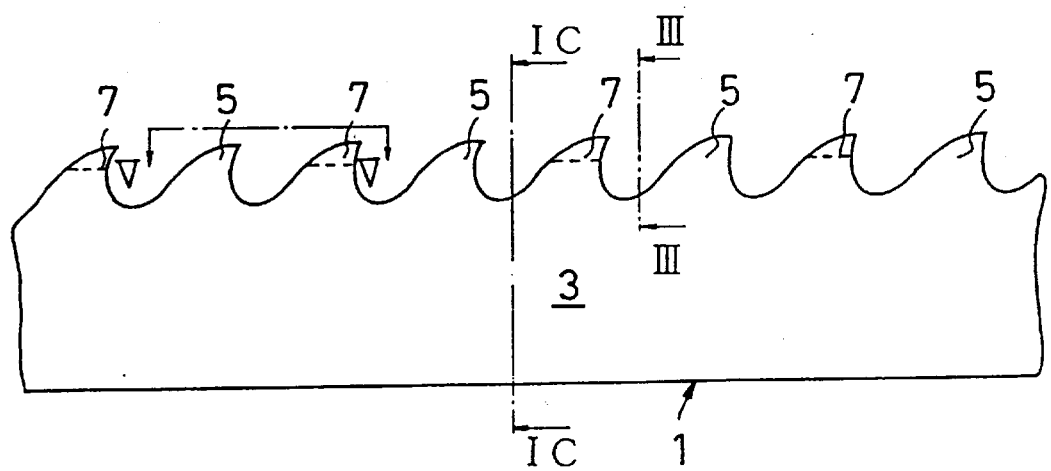
Figure 1C:
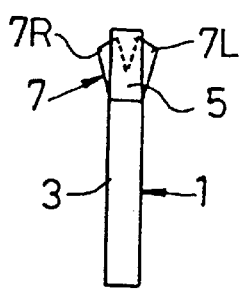

With reference to FIGS. 1A, 1B and 1C, a tool steel is used as a saw blade material. In this example, for example, a high speed tool steel (high-speed steel) is used as the saw blade material and this saw blade 1 has a body portion 3 in a longitudinal direction thereof. A preceding tooth 5 and a succeeding tooth 7 are formed as one group in this body portion 3. The preceding tooth 5 is constructed by a straight tooth having a rectangular shape in which no saw setting is performed in left-hand and right-hand directions. The succeeding tooth 7 performs a cutting operation to widen a cutting groove formed by this preceding tooth 5. An end tip portion of the above succeeding tooth 7 is parted into left-hand and right-hand portions by splitting an approximately central portion of this end tip portion on a tooth line in a thickness direction thereof The linear tooth line in the left-hand and right-hand directions prior to the parting is divided into two portions as tooth lines 7T of a left-hand set tooth 7L and a right-hand set tooth 7R. The left-hand set tooth 7L and a right-hand set tooth 7R are formed by simultaneously bending the set teeth leftward and rightward to separate the left-hand and right-hand set teeth from each other. As clearly seen in FIG. 1C, a height of the above succeeding tooth 7 is set to be lower than that of the preceding tooth 5.

This construction will next be further explained in detail. A splitting portion 7D is formed in the approximately central portion of the succeeding tooth 7 on a tooth line in its thickness direction so that the left-hand and right-hand set teeth 7L, 7R in the succeeding tooth 7 are enlarged in a V-shape. Thus, the left-hand and right-hand set teeth 7L, 7R are simultaneously bent and are separated from each other in the left-hand and right-hand directions with respect to an advancing direction of the saw blade 1. End tip outsides 7EO of the respective left-hand and right-hand set teeth 7L, 7R are projected outside the thickness of the preceding tooth 5 in the left-hand and right-hand directions. However, the clearance between end tip insides 7EI of these set teeth is smaller than the thickness of the preceding tooth 5.

When a material is cut by the saw blade 1 having the above construction, the preceding tooth 5 first cuts the material and linearly forms a cutting groove. Next, the left-hand and right-hand set teeth 7L, 7R in the succeeding tooth 7 cut this cutting groove so as to enlarge and open the cutting groove.

When the material is cut as mentioned above, the left-hand and right-hand set teeth 7L, 7R in the succeeding tooth 7 simultaneously act on symmetrical positions of the material. Accordingly, component forces in the left-hand and right-hand directions applied to the left-hand and right-hand set teeth 7L, 7R are opposed to each other and cancel each other so that vibrations of the saw blade 1 in the left-hand and right-hand directions are prevented.

Accordingly, generation of a so-called ghost pattern can be almost prevented and generation of a wavy pattern during cutting operation can be effectively prevented.

As already understood, the left-hand and right-hand set teeth 7L, 7R are simultaneously bent and separated from each other in the left-hand and right-hand directions by forming the splitting portion 7D. Therefore, teeth thickness near the end tip portions of the left-hand and right-hand set teeth 7L, 7R are approximately equal to teeth thickness near base portions thereof so that each of sectional shapes of the left-hand and right-hand set teeth is a rectangular shape.

That is, the thicknesses of the left-hand and right-hand set teeth 7L, 7R are approximately constant along their heights so that strength of the saw blade is easily maintained and wear resistance of the saw blade during cutting operation and the like. is easily improved.

FIGS. 2A to 2D show another embodiment of the saw blade. In FIGS. 2A to 2D, a saw blade 1 has a body portion 3 in a longitudinal direction thereof, A preceding tooth 5 and a succeeding tooth 7 are formed as one group in one side portion of this body portion 3. The preceding tooth 5 is constructed by a,straight tooth having a rectangular shape. The succeeding tooth 7 cuts a cutting groove formed by this preceding tooth 5 to widen this cutting groove. The number of succeeding teeth 7 is set to be plural at random. FIG. 2A shows a group 7A, a group 7l and a succeeding tooth 25. In the group 7A, succeeding teeth 9, 11 and 13 are set to one group between preceding teeth 5. In the group 7B, succeeding teeth 15, 17, 19, 21 and 23 are set to one group between preceding teeth 5. Further, for example, each of end tip portions of the succeeding teeth 9, 11 and 13 is parted into left-hand and right-hand portions by splitting an approximately central portion on a tooth line in a thickness portion thereof. Tooth lines prior to the parting exist as tooth lines of the divided left-hand set teeth 9L, 11L, 13L and the left hand set teeth 9R, 11R, 13R, and are formed to be separated from each other by simultaneously bending these set teeth leftward and rightward.

In the above group 7A, heights of the succeeding teeth 9 and 13 are approximately equal to each other, and a height of the central succeeding tooth 11 is formed to be slightly lower than the heights of the succeeding teeth 9 and 13. Left-hand and right-hand projecting amounts (set widths) of the left-hand and right-hand set teeth 9L, 9R in the above succeeding tooth 9 are set to be approximately equal to set widths of the left-hand and right-hand set teeth 13L, 13R in the succeeding teeth 13. Set widths of the left-hand and right-hand set teeth 11L, 11R in the central succeeding tooth 11 are formed to be slightly greater than set widths of the left-hand and right-hand set teeth 9L, 9R; 13L, 13R in the above succeeding teeth 9, 13.

In the above group 7B, heights of the succeeding teeth 15, 23 and set widths of the left-hand and right-hand set teeth 15L, 15R; 23L, 23R are respectively formed to be approximately equal to each other. Heights of the succeeding teeth 17, 21 are formed to be lower than those of the above succeeding teeth 15, 23. Set widths of the left-hand and right-hand set teeth 17L, 17R; 21L, 21R are formed to be approximately equal to each other and slightly greater than set widths of the above succeeding teeth 15, 23. A height of the central succeeding tooth 19 is formed to be minimum, but set widths of the left-hand and right-hand set teeth 19L, 19R are formed to be maximum.

The succeeding tooth 13 of the above group 7A and the succeeding tooth 15 of the group 7B surround the straight tooth as the preceding tooth 5, Accordingly, it is desirable to respectively set the heights and set widths of such succeeding teeth to be approximately equal to each other. However, these heights and set widths are not necessarily set to be respectively approximately equal to each other in a certain case.

A height of the succeeding tooth 25 and set widths of the left-hand and right-hand set teeth 25L, 25R are desirably set to be respectively approximately equal to a height and a set width of the succeeding tooth 23 located on the opposite side thereof with respect to the straight tooth as the preceding tooth 5. However, the height of the succeeding tooth 25 and the set widths of the left-hand and right-hand set teeth 25L, 25R are not necessarily set to be respectively approximately equal to the height and the set width of the succeeding tooth 23.

In the saw blade 1 having the above construction, each of the succeeding teeth has symmetrically the left-hand and right-hand set teeth divided leftward and rightward so that operating effects similar to those in the saw blade 1 illustrated in FIG. 1 are obtained. Further, the plural succeeding teeth are arranged and divided into groups, and the clearance between end tip insides of the left-hand and right-hand set teeth of each of the succeeding teeth is set to be smaller than the thickness of the preceding tooth. Therefore, the uncut remaining portion left in a triangular shape between the above left-hand and right-hand set teeth is cut by each preceding tooth so that a metallic material can be reliably cut. Further, when a cutting groove made by the preceding tooth 5 is enlarged and opened, a cutting amount for enlarging and opening the cutting groove can be dispersed to each succeeding tooth and cutting resistance of each succeeding tooth can be restrained to be small and chips can be finely cut.

Further, since the cutting resistance of each succeeding tooth can be reduced and dispersed, component forces in the left-hand and right-hand directions applied to the left-hand and right-hand set teeth in each succeeding tooth are reduced so that vibrations of the saw blade 1 in the left-hand and right-hand directions can be effectively restrained and an accuracy in cutting plane can be improved.

When the succeeding teeth are divided into groups, it is desirable to set the number of succeeding teeth to an odd number. However, the number of succeeding teeth may be set to an even number. Further, preceding teeth 5 as straight teeth may be continuously arranged before and after the tooth. That is, the number of succeeding teeth and the number zof preceding teeth in each group may be set at random. Pitches of the preceding and succeeding teeth may be set to be an equal pitch or unequal pitches.

As mentioned above, in each of the saw blade 1 shown in FIGS. 1A to 1C and FIGS. 2A to 2D, when an end tip portion of each of the succeeding teeth 7 to 25 is parted at an approximately central portion thereof on a tooth line in the thickness direction and is simultaneously bent leftward and rightward with respect to the preceding tooth 5, the left-hand set teeth 7L to 25L and the right-hand set teeth 7R to 25R can be separated and formed with left-hand and right-hand symmetry. Further, the bending operation produces a side face relief angle quickly in comparison with the conventional polishing operation.

Figure 3:
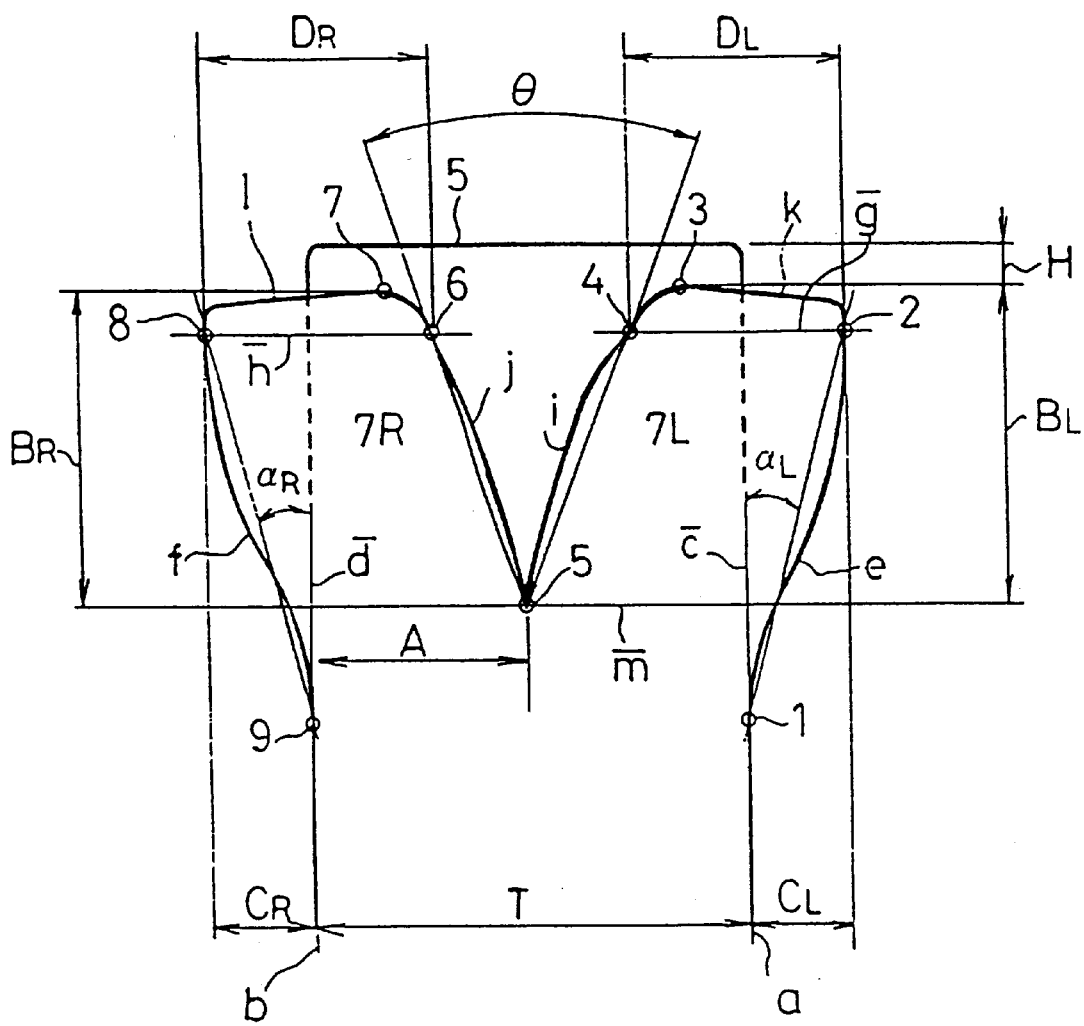
FIG. 3 is an explanatory view for explaining the size of a split position when a succeeding tooth of the saw blade in this invention is split, and is a view taken along line III—III of FIG. 1B.

When a material is cut by using each saw blade 1, almost no ghost pattern is caused, no wavy pattern is caused and a cutting deviation amount during cutting operation can be reduced. Further, since the strength of a tooth edge corner portion of a succeeding tooth is large, a stabler heavy cutting operation can be performed. As shown in FIG. 3, for example, the succeeding tooth 7 among succeeding teeth is parted into left-hand and right-hand portions at an approximately central portion of a tooth edge on a tooth line in the thickness direction thereof so that set widths of the left-hand set tooth 7L and the right-hand set tooth 7R can be easily adapted to be larger than the thickness of the preceding tooth 5. Further, the left-hand and right-hand parting operation is performed for a short time and the set teeth can be simultaneously and symmetrically bent leftward and rightward.

With respect to the succeeding tooth 7 in FIG. 3 (a view seen from line III—III of FIG. 1B), straight lines $\bar{c}$ and $\bar{d}$ are drawn along side faces a, b of the body portion, and points where the straight lines $\bar{c}$, $\bar{d}$ are separated from the side faces a, b are set to points 1, 9. These points 1, 9 are a starting points of the projection of the side faces a, b.

A side face of a tooth portion 7L is set to a face e, and a side face of a tooth portion 7R is set to a face f. Most projecting points of these faces are respectively set to points 2, 8. These points are points for measuring the projecting amounts (set widths). A face of a center groove on the side of tooth 7L is set to a face i, and a face thereof on the side of tooth 7R is set to a face j. A vertex of the groove portion is set to a point 5. A horizontal line passing the point 5 is set to a straight line $\bar{m}$. A horizontal line passing the point 2 is set to a straight line $\bar{g}$. A horizontal line passing the point 8 is set to a straight line $\bar{h}$. At this time, an intersecting point of the straight line $\bar{g}$ and the face i is set to a point 4. An intersecting point of the straight line $\bar{h}$ and the face j is set to a point 6.

A line of a portion cut by the straight line $\bar{g}$ is called a 7L-tooth line and a line of a portion cut by the straight line $\bar{h}$ is called a 7R-tooth line. The 7L tooth line and the 7R tooth line are respectively set to lines k and l. A tooth line in the thickness direction of a tooth edge of the succeeding tooth prior to the parting is similar to a tooth line in the thickness direction of a tooth edge of the tooth after the deformation caused by the parting. Points on the lines k and l farthest from the straight line $\bar{m}$ are set to points 3, 7.

Figure 4:
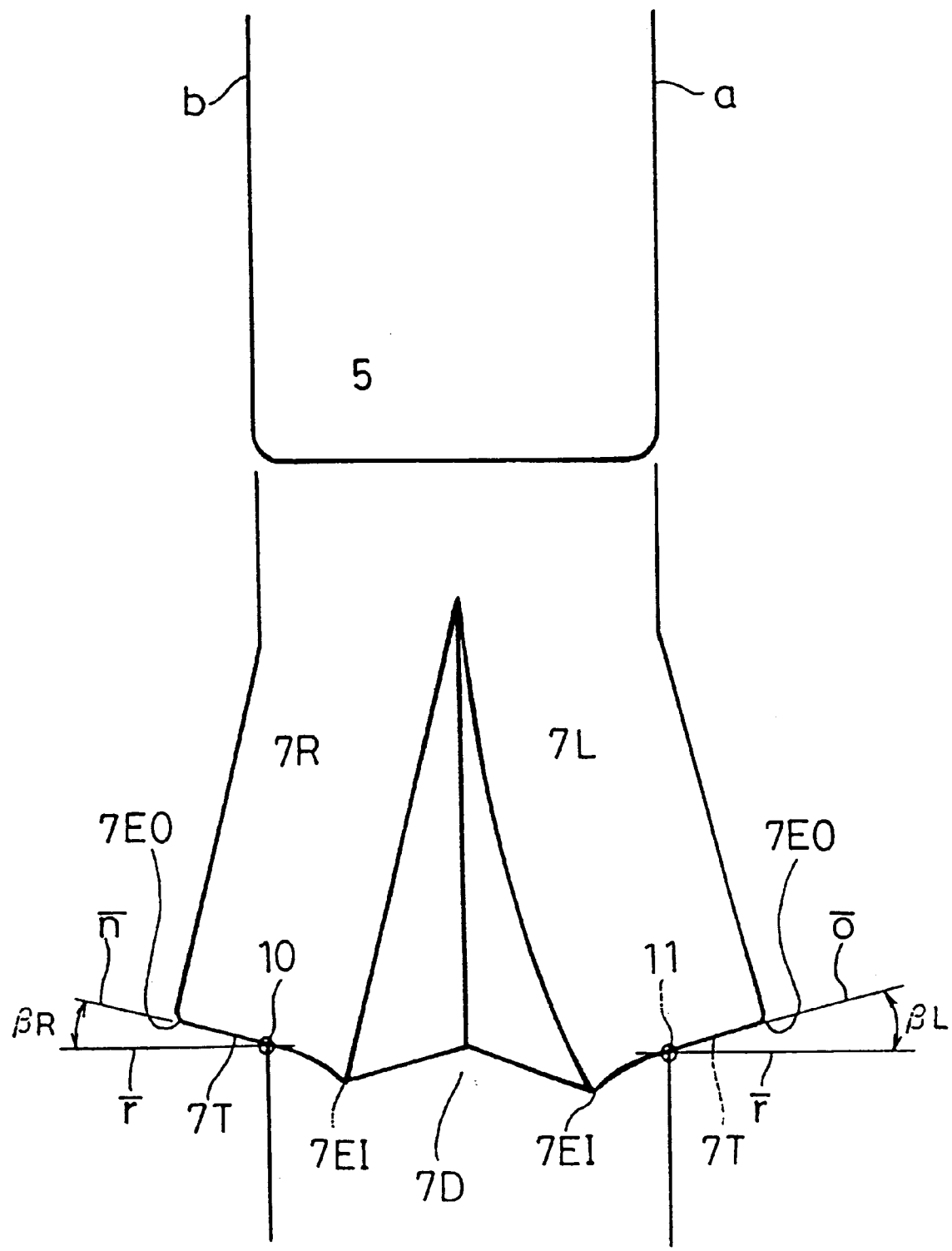
FIG. 4 is a plan view showing the succeeding tooth in detail and is a view taken along line IV—IV of FIG. 1B.

In FIGS. 3 and 4, the preceding tooth 5 and the succeeding tooth 7 are described by thick lines, and faces a, b, e, f, i, j and lines k, l are shown.

T: distance between faces a and b;

DL: distance between points 2 and 4;

DR: distance between points 6 and 8;

CL: distance between point 2 and straight line $\bar{c}$;

CR: distance between point 8 and straight line $\bar{d}$;

αL: angle formed between straight line $\bar{c}$ and straight lines $\overline{1,2}$;

αR: angle formed between straight line $\bar{d}$ and straight lines $\overline{9,8}$;

A: distance between point 5 and straight line d;

θ: angle formed between straight line $\overline{5,4}$ and straight lines $\overline{5,6}$;

BL: distance between straight line $\bar{m}$ and point 3;

BR: distance between straight line $\overline{m}$ and point 7; and

H: a smaller one of the distance between a tooth edge end tip; portion of the preceding tooth 5 and point 3, and the distance between the tooth edge end tip portion of the preceding tooth 5 and point 7.

Figure 5:
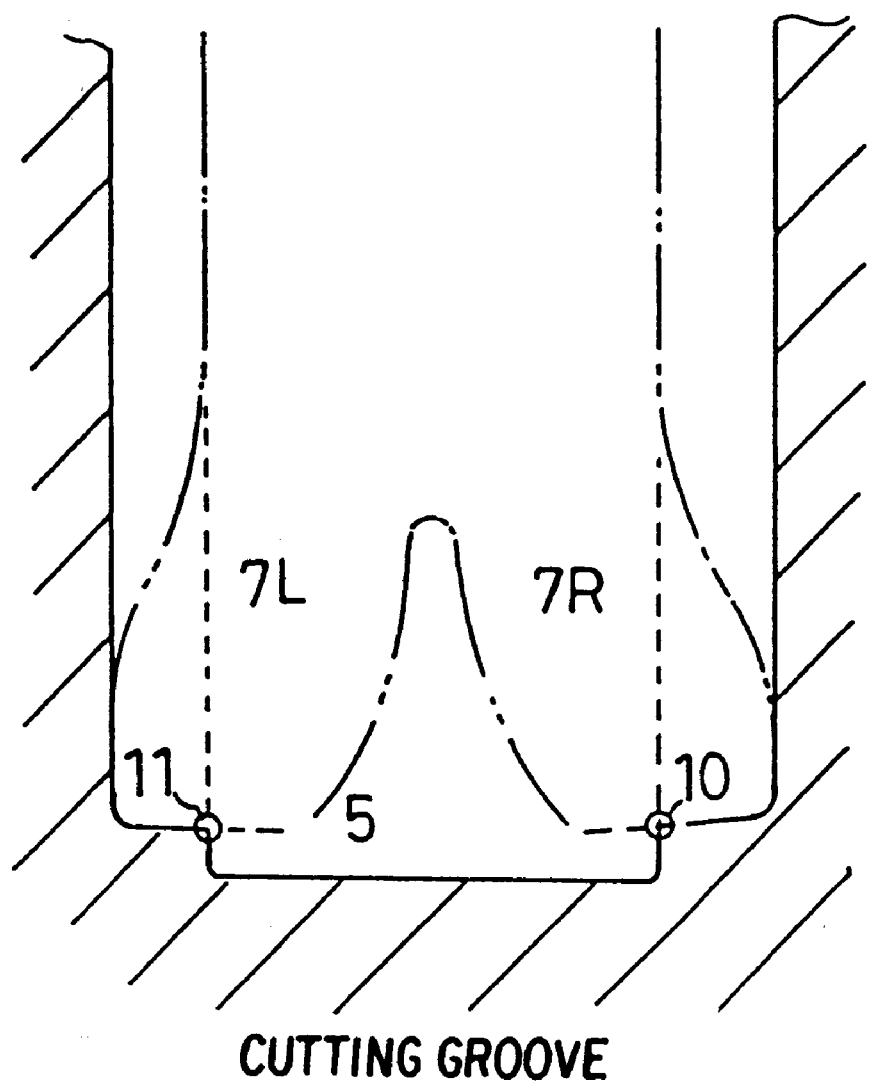
FIG. 5 is a view of a cutting groove formed by preceding and succeeding teeth, seen from an advancing direction of the saw blade.
Figure 6A:
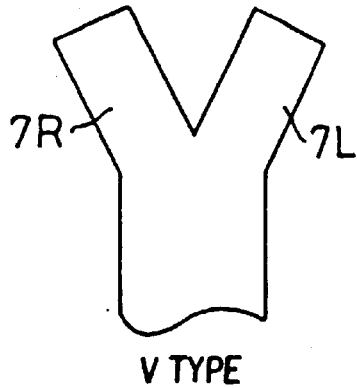
FIGS. 6A to 6F are views showing various kinds of shapes of a center groove in the succeeding tooth.
Figure 6B:
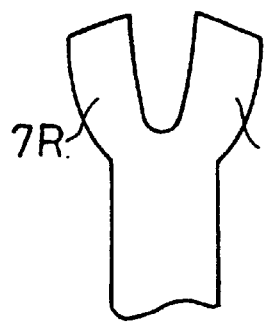
Figure 6C:
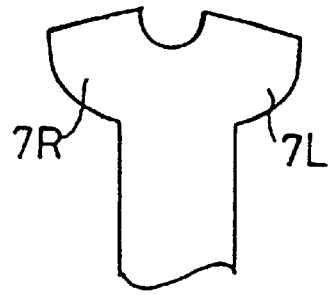
Figure 6D:
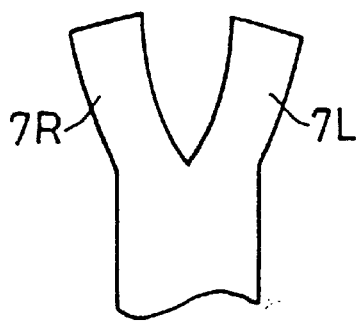
Figure 6E:
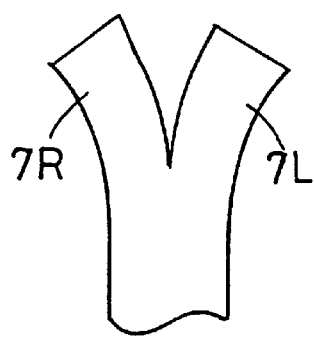
Figure 6F:
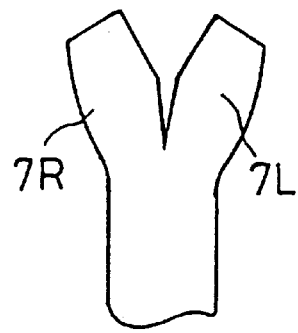
Figure 15A:
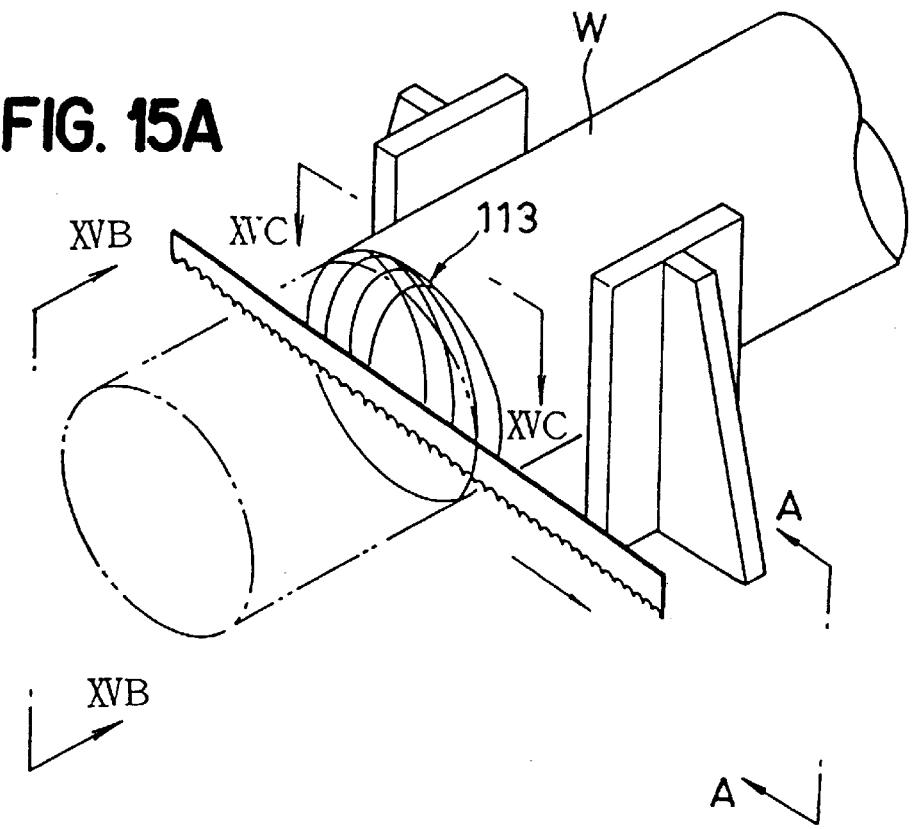
Figure 15B:
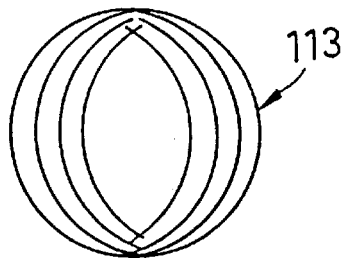
Figure 15C:
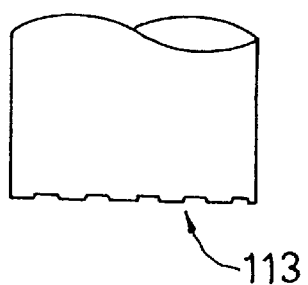
Figure 16A:
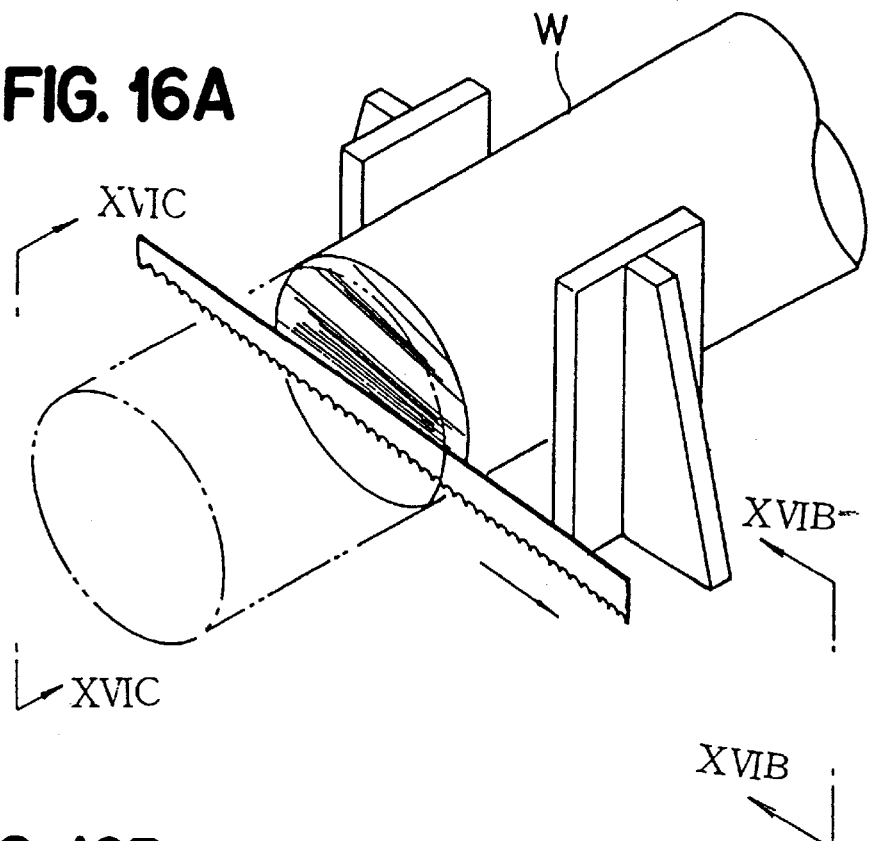
Figure 16B:
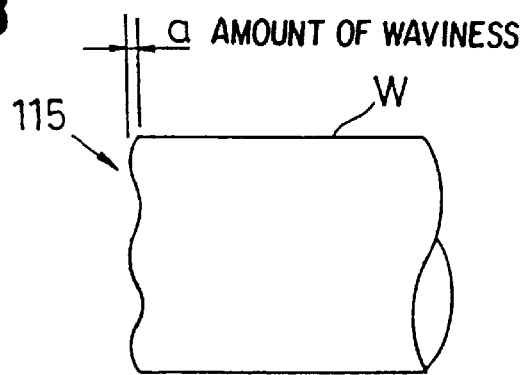
Figure 16C:
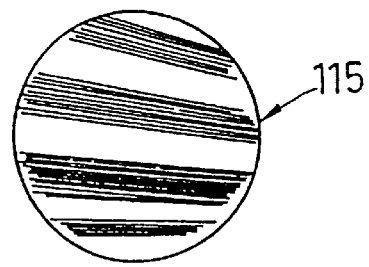
Figure 17:
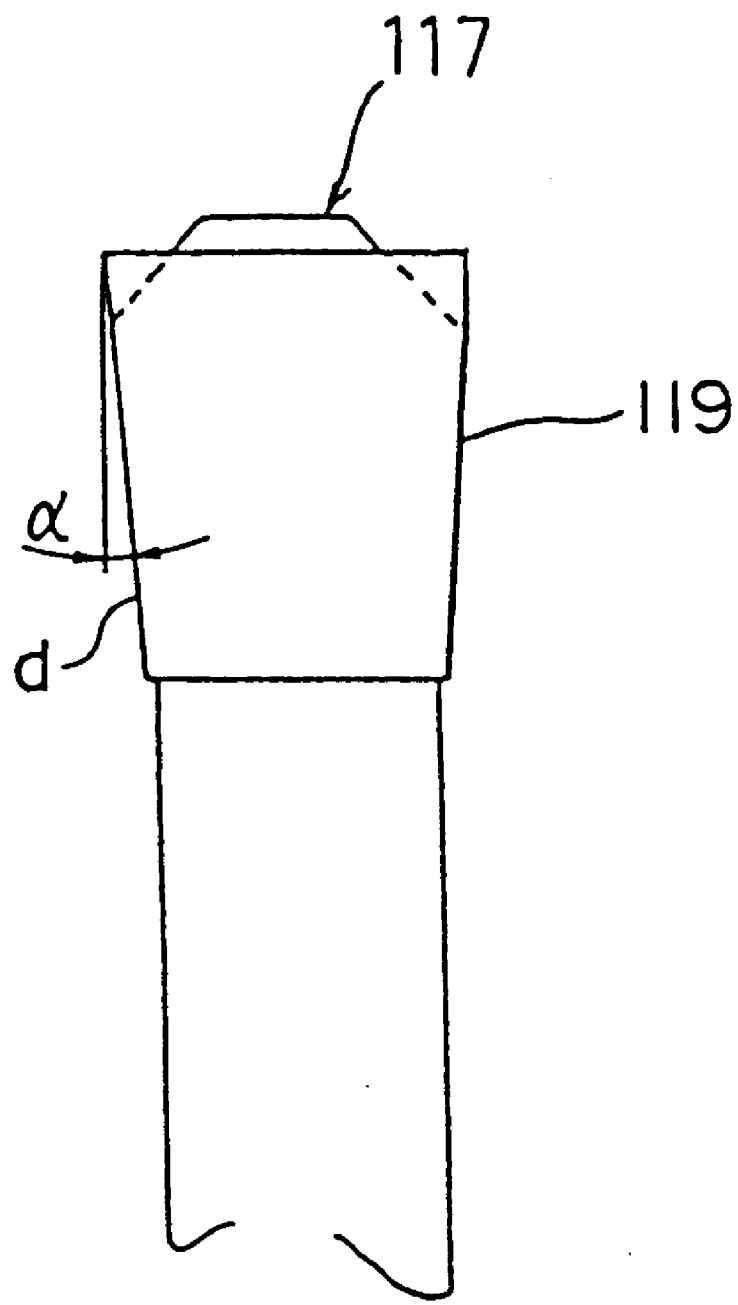
FIG. 17 is a side view showing another conventional saw blade.

In FIG. 4 (a view seen from line IV—IV of FIG. 1B) and FIG. 5 (a view seen from direction A—A of FIG. 15), an intersecting point of cutting grooves respectively formed by the preceding tooth 5 and by the succeeding tooth 7 is set to a point 11 on the 7L-tooth side of the succeeding tooth 7, and is set to a point 10 on the 7R-tooth side of the succeeding tooth 7. A tangential line at the point 11 in FIG. 4 is set to a straight line o. A tangential line at the point 10 in FIG. 4 is set to a straight line n.

βL1: angle formed between straight line $\overline{o}$ and line $\overline{r}$ perpendicular to the body side face a; and βR: angle formed between straight line $\overline{n}$ and line $\overline{r}$ perpendicular to the body side face b.

Here, as shown in FIG. 3, for example, the distance A of the split position in the succeeding tooth 7 is preferably set to satisfy T/2−0.1 mm≦A≦T/2+0.1 mm where the thickness of the body portion is T. It is preferable to set A=T/2. However, it is considered that there are changes in material shapes and the like. Thus, it is found that an allowable deviation from T/2 is about ±0.1 mm according to cutting tests. If the deviation exceeds 0.1 mm, left-hand and right-hand projecting amounts are excessively different from each other so that the life of the saw blade becomes short because of the occurrence of the deviation of the cutting plane in its early stages , the defects in cutting plane and the like.

As shown in FIG. 4, tooth line inclination angles βL and βR of the left-hand set tooth 7L and the right-hand set tooth 7R desirably satisfy βL>0° and βR>0°. If β>0°, the chips can be divided at a central portion of the teeth even when a tooth edge of the preceding tooth 5 is clogged by melting attachment or is chipped for other reasons, and a heavy cutting operation having a cutting amount larger than split depths BL and BR is performed. This is because the wind directions of chips cut by the left-hand and right-hand set teeth 7L and 7R are angled by βL and βR and are opposed to each other. Further, since the chips are wound in a spring shape, a removing property of the chips provided by a chip removing apparatus (a wire brush and the like.) is improved so that tooth edge chipping caused by the melting attachment is reduced. The ranges of the size A of the parting position and the tooth line inclination angle β (which means angles βL, βR) are provided on the basis of experimental results.

Figure 18A:
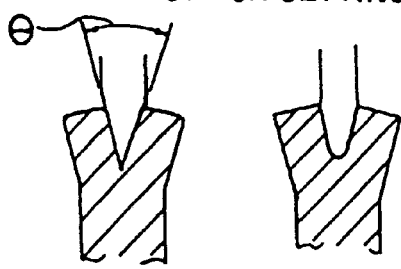
FIGS. 18A to 18E are respectively explanatory views showing a tool for forming left-hand and right-hand set teeth in the succeeding tooth and a method for forming the left-hand and right-hand set teeth.

Tool or methods used to separate the tooth portion center leftward and rightward by parting and bending the tooth portion center are as follows:

1) A case in which a pushing splitting operation and a bending operation is once performed by a tool having a wedge shape with a sharpened edge tip or a rounded edge tip each having a parting angle θ. [FIG. 18A]

Figure 18B:
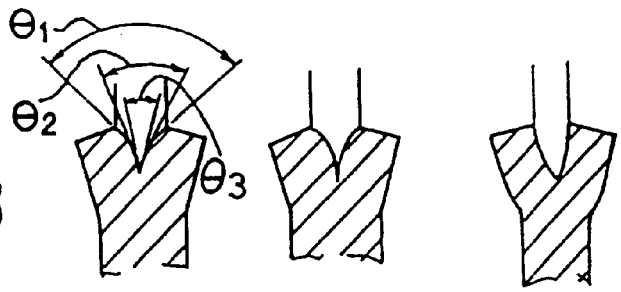

2) A case in which a pushing splitting operation and bending operation is once performed by a tool having a wedge shape with a sharpened edge tip or an rounded edge tip each having a plurality of parting angles θ, or a tool having a wedge shape extended in an arc shape. [FIG. 18B]

Figure 18C:
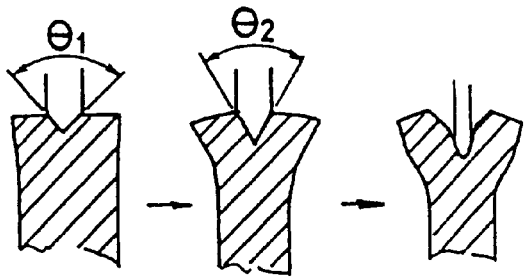

3) A case in which pushing splitting operations and bending operations are performed by using several kinds of tools each having sharpened edge tip or rounded edge tip having a parting angle θ. [FIG. 18C]

Figure 18D:
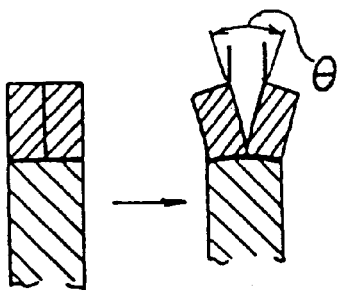

4) A case in which tooth materials of T/2 are first joined and are then pushed and widened by a tool formed in a shape such as a wedge shape and the like. [FIG. 18D]

Figure 18E:
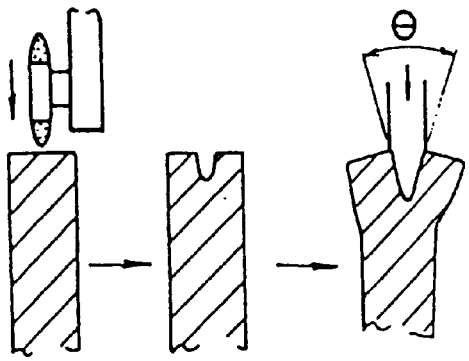

5) A case in which a notch is formed or a parting operation is performed by a cutting means such as a grinding stone and the like in an approximately central portion of a tooth edge on a tooth line in its thickness direction, and this central portion is then pushed and widened by a tool formed in a shape such as a wedge shape and the like. [FIG. 18E]

The groove of the tooth portion center may be in any shape. For example, a V-type, a U-type, a circular type, a concave type, a convex type, a multiple stage type and the like, as shown in FIGS. 6A to 6F are considered.

When one preceding tooth 5 and one succeeding tooth 7 are set to one group as shown in FIGS. 1A to 1C, i.e., when the tooth portion center groove is formed in the V-shape by cold working in which the splitting operation and the simultaneous bending operation is performed by one pressing with one tool, the parting angle θ is desirably set to 20°≦θ≦50°. If θ<20°, a tool for performing the parting operation tends to be chipped and no sufficient separating projection can be obtained. In contrast to this, if θ>50°, a crack can be formed near a vertex 5 of the V-shaped groove so that a tooth strength tends to be insufficient. However, the saw blade is usable even when θ>50°; if the material is a free-cutting material, no tooth is chipped even when θ=90°.

A side face relief angle α (means αL, αR) is preferably set to 5°≦α≦20° and is more preferably set to 10°. When the side relief angle is obtained by polishing work, α≦4° is conventionally set. This is a limit maximum side face relief angle because the body portion of the saw blade can be damaged in the relation of a polishing grinding stone shape. In this case, when wearing of an edge tip progresses, a cutting tooth portion is lost in its early stages. However, if ≧5°, the above set widths are increased so that the wearing progresses slowly, and the cutting operation can be performed for a long period. If α>20°, the V-shaped groove vertex 5 is cracked in a certain case so that the strength of the tooth portion tends to be insufficient. Further, it is expected that there is a defect in shape of a tooth edge so that it is difficult to perform the cutting operation.

The projecting amount C (means CL, CR) is desirably set to 0.1 mm≦C≦0.5 mm and is more desirably set to 0.25 mm. In the case of C<0.1 mm, the projecting amount (a protruding amount) is small, and a cutting edge portion tends to be lost in its early stages when wearing progresses. In the case of C>0.5 mm, the width of a cutting groove is excessively wide so that resistance during cutting operation tends to be increased. Further, a crack tends to be caused near the vertex 5 of the V-shaped groove and the tooth strength tends to be insufficient.

Further, the parting depth B (means BL, BR) is set to 0.5 mm≦B≦2.0 mm and is desirably set to 1.0 mm. In the case of B<0.5 mm, no sufficient projection can be obtained. In the case of B>2.0 mm, a crack tends to be caused near the vertex 5 of the V-shaped groove and the tooth strength tends to be insufficient.

A difference H in tooth height with respect to the preceding tooth 5 is preferably set to 0.02 mm≦H≦0.5 mm and is desirably set to 0.15 mm. In the case where the succeeding and preceding teeth prior to the parting have the same height, the succeeding tooth after the parting is lowered by 0.02 mm when the saw blade is processed in a manner for minimizing the difference in tooth height in which the parting angle θ=20° and the projecting amount C=0.1 mm. In the case of H>0.5 mm, the preceding tooth performs cutting operation while its tooth edge side face rubs the material by a depth more than 0.5 mm at an initial stage of inserting and cutting operations of the material. Therefore, resistance of the preceding tooth at the beginning of the cutting operation is large so that wearing of the preceding tooth progresses rapidly, and the life of the saw blade tends to end in its early stages. Further, thick burrs may be produced at the final stage of the cutting operation so that it is difficult to remove the burrs from the saw blade.

However, when the parting operation is performed by a method of a two-stage split (a split is formed by twice operations), a three-stage split (a split is formed by three times operations), hot working, and the like, the foregoing problems are not caused.

These ranges of the side face relief angle α, the parting angle θ, the parting depth B, the projecting amount C and the height difference H with respect to the preceding tooth are based on experimental results.

When a plurality of teeth forms a group in which a preceding tooth (or teeth) 5 is constructed by one tooth or are constructed by a plurality of continuosly arranged teeth 5, and the number of succeeding teeth in the group are random, as shown in FIGS. 2A to 2D, there is an effect of a reduction in cutting resistance in addition to effects of FIGS. 1A to 1C. In FIG. 2, the number of succeeding teeth is set to 3, 5 and 1 at random, for an example. However, the random arrangement includes an arrangement in which the number of teeth is constant, for example, three, five and the like. The random arrangement also includes an arrangement in which groups having a random number of teeth are arranged aperiodically in one saw blade. The random arrangement further includes an arrangement in which groups of plural random teeth are periodically arranged. The parting angle θ is set as mentioned above when the center groove of a succeeding tooth is formed in a V-shape, and split and simultaneously bent in one time by cool working.

The side face relief angle a is desirably set to $0° \leq \alpha \leq 20°$. If α>20°, the vertex 5 of the V-shaped groove tends to be cracked and the tooth portion strength tends to be insufficient.

The projecting amount is desirably set to 0 mm<C≦0.5 mm and is preferably scattered in magnitude within one teeth group. In the case of C>0.5 mm, the width of a cutting groove is too wide and resistance during cutting operation tends to be increased. A crack also tends to be caused near the vertex 5 of the V-shaped grooves and the tooth strength tends to be insufficient. Further, the parting depth B is desirably set to 0 mm<B≦2.0 mm, and a value of the parting depth in this range is effective to process the saw blade in the above range of the projecting amount. In the case of B>2.0 mm, a cram tends to occur near the vertex 5 of the V-shaped groove and the tooth strength tends to be insufficient.

The height difference H with respect to the preceding tooth 5 is desirably set to 0 mm≦H≦0.5 mm. In the case of H>0.5 mm, the preceding tooth performs the cutting operation while its tooth edge side face greatly rubs material by a depth more than 0.5 min at an initial stage of inserting and cutting operations of the material. Therefore, resistance of the preceding tooth at the beginning of the cutting operation is large so that wearing of the preceding tooth tends to progress rapidly and life of the saw blade tends to end in its early stages. Further, thick burrs are caused at the final stage of the cutting operation so that it is difficult to remove the burrs from the saw blade. In the case of 0 mm>H, the cutting resistance increases and: the life of the saw blade ends in its early stages because the tooth edge insides of the parted set teeth are deformed in the shape of a curve. However, such problems are not caused when the saw blade is split by the twice or three times splitting operation, hot working and the like.

These ranges of the side face relief angle α, the parting angle θ, the parting depth B, the projecting amount C and the height difference H with respect to the preceding tooth are provided by experimental results.

A tooth line width D (which means DLL, DR) must satisfy D>C (DLL>CL, DR>CRY), and D=T/2 is desirably set although there is a case in which T/2<D is formed by a parting bending operation method. If D=T/2, a deforming amount of the tooth edge tooth line is small so that an optimum tooth edge shape is obtained, (Embodiment)

Figure 7:
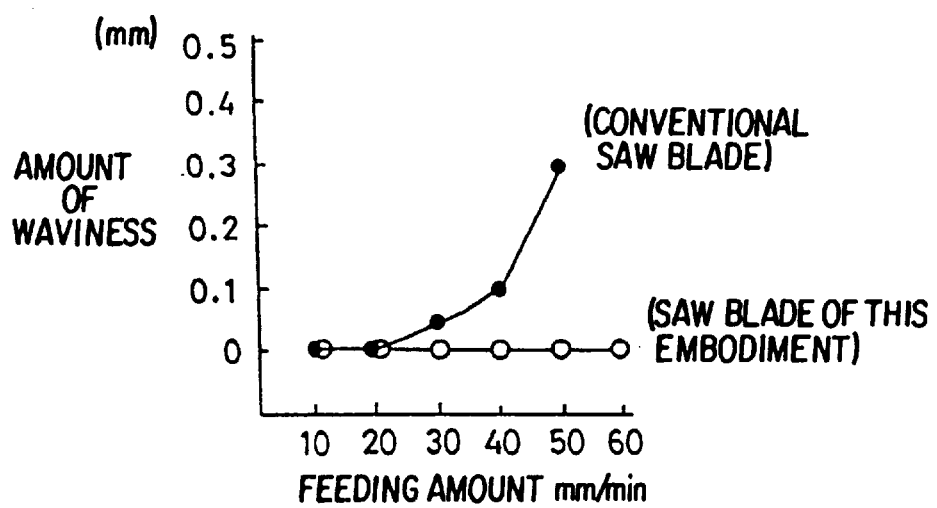
FIG. 7 is a graph showing the relation between a feeding amount and a amount of waviness when a material is cut by using a conventional saw blade and the saw blade in this embodiment.
Figure 9:
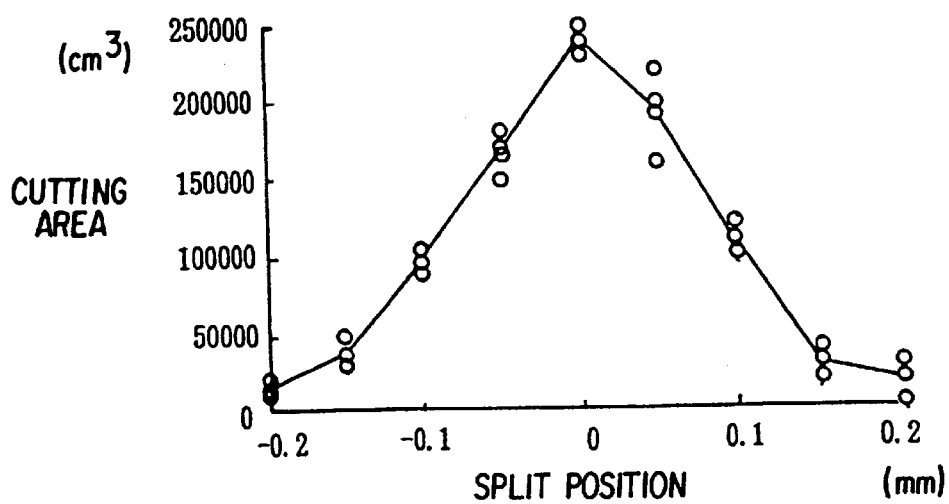
FIG. 9 is a graph showing the relation between a split position and a cutting area in the succeeding tooth in the present invention.
Figure 12A:
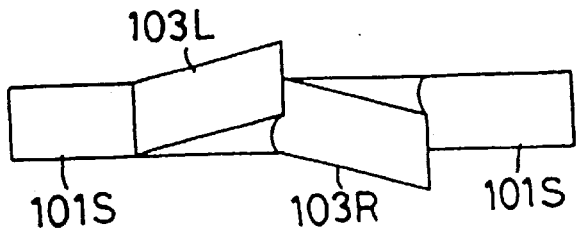
Figure 12B:
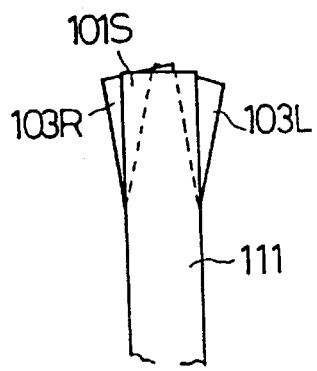
Figure 13A:
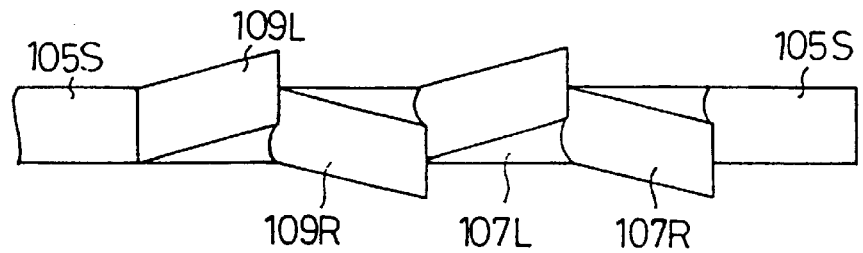
Figure 13B:
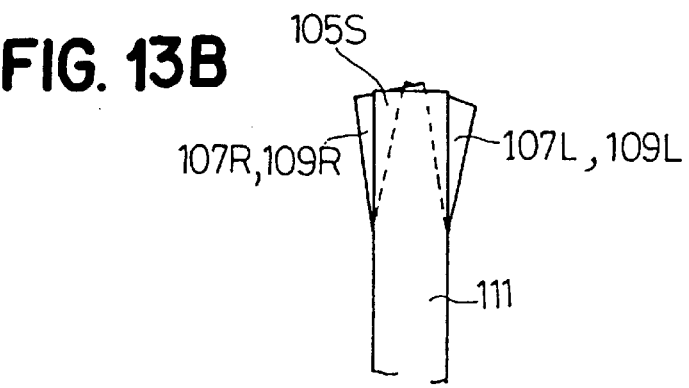
Figure 14:
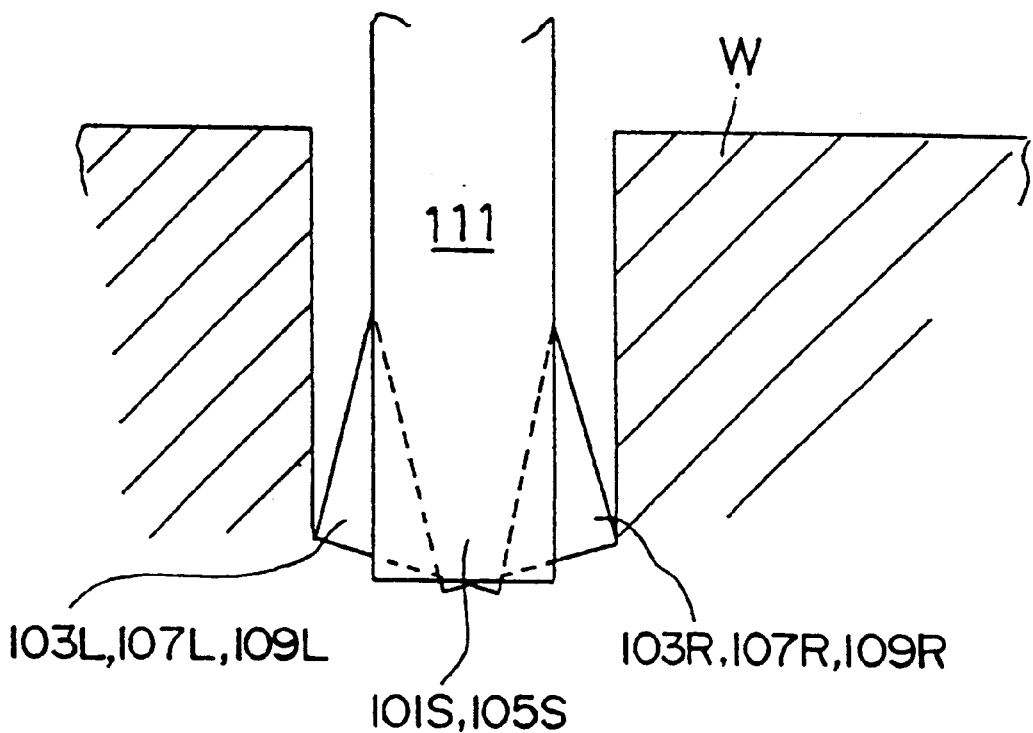
FIG. 14 is a cross-sectional view showing a state in which a material is cut by the saw blade shown in each of FIGS. 12 and 13.
Figure 19:
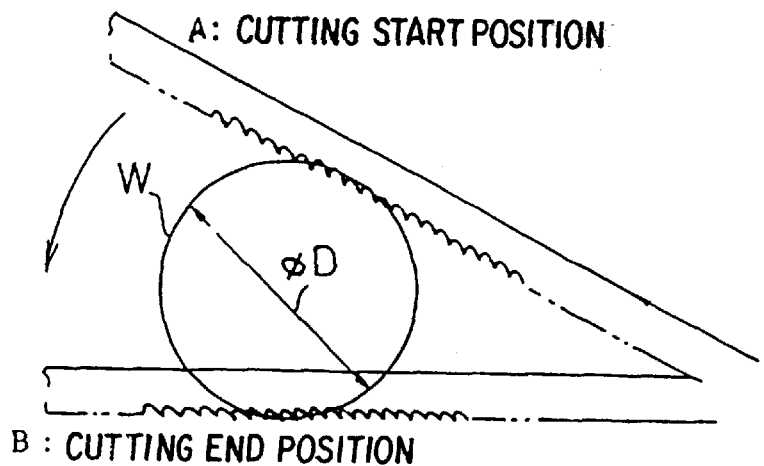
FIG. 19 is a view for explaining a method for calculating a feeding amount (a cutting amount).

A conventional saw blade (α'=11° and projecting amount is 0.4 mm) shown in FIGS. 12A and 12B and the saw blade 1 (H=0.15 mm, α=10°, β=8°, θ=30°, B=1.0 mm, C=0.25 mm) in this embodiment shown in FIG. 1 are used. These saw blades have teeth formed at the same pitch. A feeding amount (a cutting amount) of a material S45C, φ250 is changed at a saw speed 30 mm/min, and the states of the amounts of waviness are compared with each other, A continuous cutting operation is performed with a constant feeding amount, and cutting deviation amounts are compared with each other. FIGS. 7 and 9 show the results thereof. Here, the feeding amount is calculated by a method shown in FIG. 19.

Figure 8:
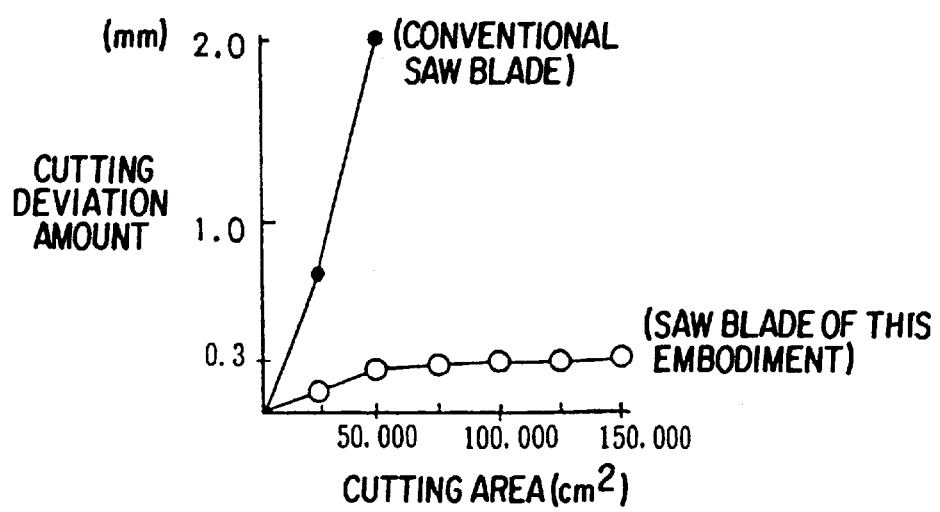
FIG. 8 is a graph showing the relation between a cutting area and a cutting deviation amount when the material is cut by using the conventional saw blade and the saw blade in this embodiment.
Figure 20:
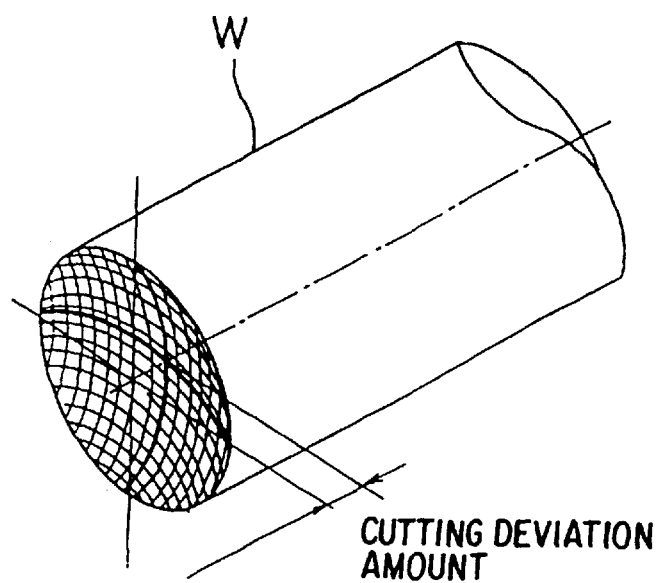
FIG. 20 is a perspective explanatory view showing the cutting deviation amount in the cutting plane of the material.

As shown in FIGS. 7 and 8, in the conventional saw blade, the amount of waviness is 0.3 mm when the feeding amount is 50 mm/min. In this condition, the cutting deviation amount shown in FIG. 20 reaches 2.0 mm in cutting of 50,000 cm². In comparison with this conventional saw blade, in the case of the saw blade 1 in this embodiment, no wavy portion is caused when the feeding amount is 50 mm/min, and the cutting deviation amount shown in FIG. 20 is 0.3 mm after the cutting of 150,000 cm².

As shown in FIG, 9, which shows the relation between a split position and a cutting area, and in which 0 corresponds to a saw blade in which all teeth are split in a position of A=T/2, such saw blade can cut averagely about 250,000 cm². In FIG. 9, 0.1 mm and −0.1 mm respectively correspond a saw blade in which the teeth are shifted approximately 0.1 mm at their maximums in split position on the left-hand and right-hand sides of one saw blade. In this case, the saw blade can cut averagely about 100,000 cm². Further, 0.2 mm and −0.2 mm respectively correspond a saw blade in which the teeth shifted approximately 0.2 mm at their maximums in split position on the left-hand and right-hand sides of one saw blade. In this case, the saw blade can cut averagely about 20,000 cm². When the cutting area of 100,000 cm2 is set to a successful line, an allowable range is set to a shift ±0.1 in split position.

Figure 10:
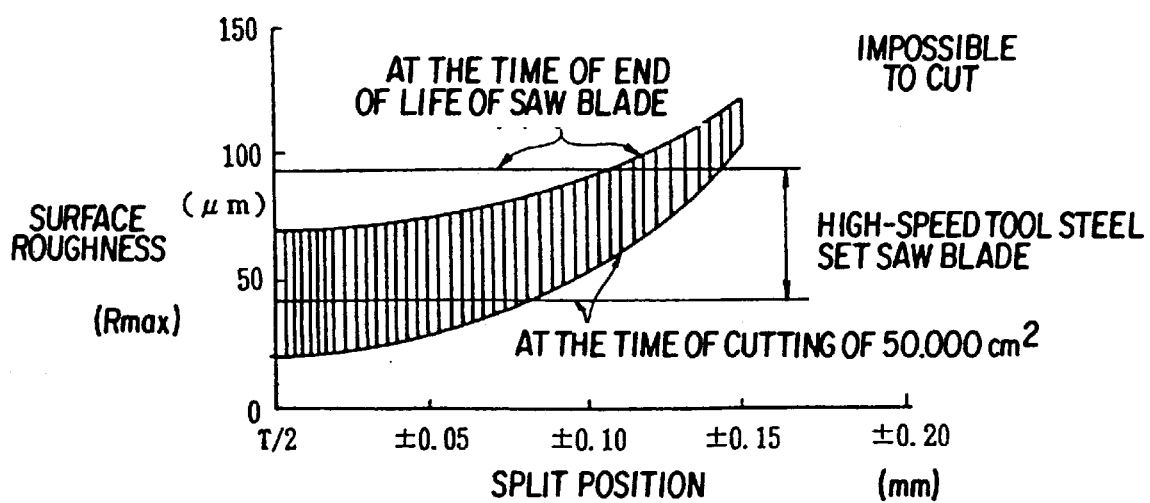
FIG. 10 is a view showing the relation between the split position in the succeeding tooth in the present invention and a surface roughness.

The graph in FIG. 10, which shows the relation between the split position and a surface roughness, shows surface roughness Rmax of a material S45C, φ250 at the time of cutting of 50,000 cm² and at the time of ending of the life time of the saw blade. FIG. 10 simultaneously shows the surface roughness of a conventional set saw blade in which a high speed tool steel is used as a tooth material. In the case of this graph, data at ±0.1 mm show Rmax provided by cutting the material with the saw blade in which the split position A is dispersed in a range of T/2−0.1 mm≦A≦T/2+0.1 mm. The cutting surface roughness is equal to that in the conventional set saw blade until this dispersion. When the dispersion is ±0.2 mm, the life of the saw blade ends before the cutting material is cut in the area of 50,000 cm². Accordingly, in this case, there are no data and "impossible to cut" is shown in FIG. 10.

Figure 11A:
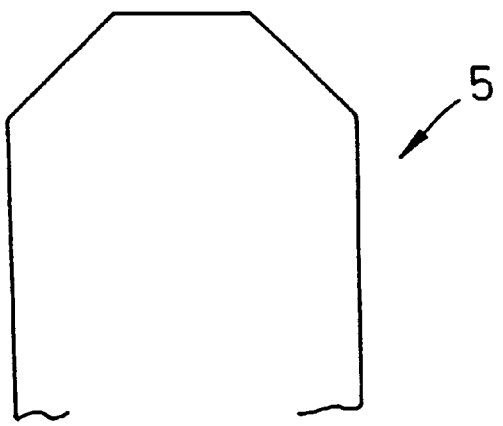
FIGS. 11A and 11B are views showing other examples of the succeeding tooth in the present invention.
Figure 11B:
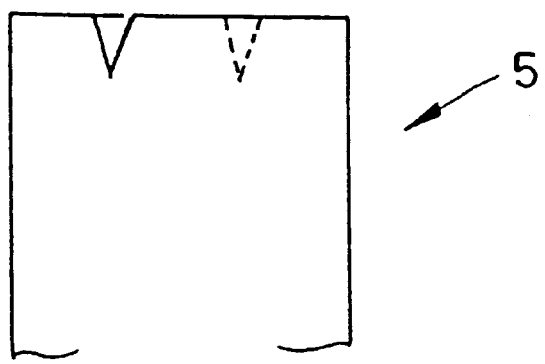
Figure 21A:
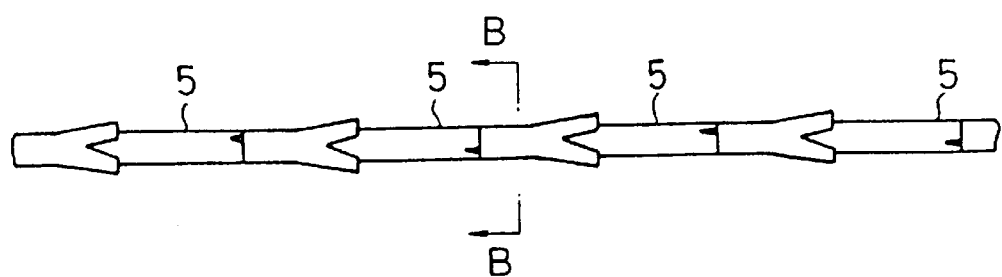
FIG. 21A is a plan view showing an example of the shape of a notch in the preceding tooth and FIG. 21B is a view taken along line B—B of FIG. 21A.
Figure 21B:
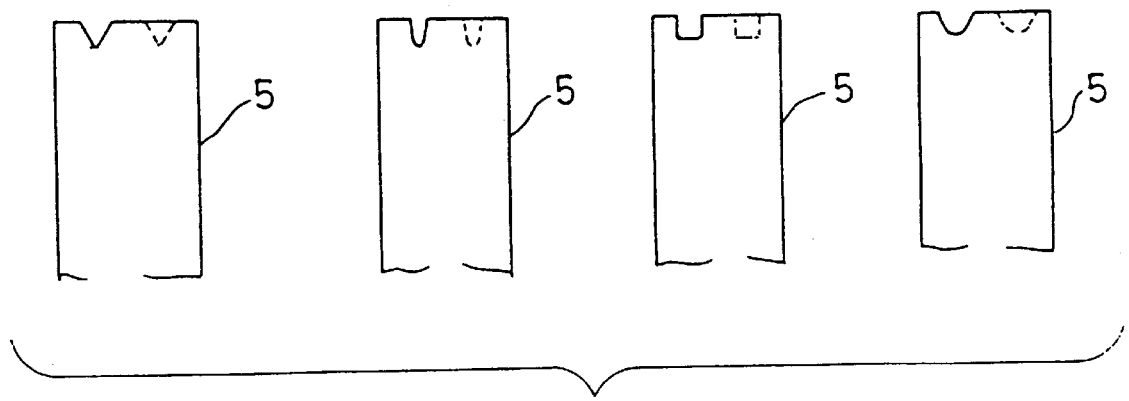

This invention is not limited to the above-mentioned embodiments, but can be embodied in other forms by suitable modifications. In the embodiments of the present invention, the preceding tooth 5 is constructed by a straight tooth having a rectangular shape as shown in each of FIGS. 1A to 1C and FIGS. 2A to 2D. However, for example, as shown in FIGS. 11A and 11B, it is considered that an end tip of the preceding tooth has a trapezoidal shape and the preceding tooth is constructed by a straight tooth having V-shaped notches at an end tip thereof shifted respectively on left-hand and right-hand sides from a tooth edge center on a tooth line in a tooth edge thickness direction. Accordingly, various kinds of shapes of the straight tooth are considered. Further, the notches of a tooth type in FIG. 11B are formed in the V-shape, but may be formed in a U-shape, a rectangular shape, a trapezoidal shape and the like, as shown in FIG. 21.

S45C is illustrated as the material to be cut, but the metalic material to be cut is not limited to S45C. A metallic blade according to the embodiment of the present invention can be also applied to cutting of a general metallic material.

INDUSTRIAL APPLICABILITY

As can be seen from the above explanation of the embodiments, the invention of claim 1 resides in a saw blade comprising a preceding tooth constructed by a straight tooth unset in left-hand and right-hand directions and a succeeding tooth for cutting a cutting groove formed by the preceding tooth to enlarge and open the cutting groove in width, wherein the succeeding tooth has left-hand and right-hand set teeth bent in the left-hand and right-hand directions by splitting an approximately central portion of a tooth edge on a tooth line in its thickness direction, the clearance between end tip insides of the left-hand and right-hand set teeth is smaller than the thickness of the preceding tooth.

Thus, when a material is cut by the succeeding tooth, the left-hand and right-hand set teeth formed in the succeeding tooth simultaneously act on the material in the same place so that component forces in the left-hand and right-hand directions are opposed to each other and cancel each other. Thus, vibrations of the saw blade in the left-hand and right-hand directions can be effectively prevented. Therefore, ghost pattern tending to be caused during cutting operation and a wavy pattern tending to be caused during the cutting operation can be effectively prevented.

Further, since the clearance between the end tip insides of the left-hand and right-hand set teeth of each succeeding tooth is smaller than the thickness of the preceding tooth, the uncut remaining portion left in a triangular shape between the above left-band and right-hand set teeth is cut by each preceding tooth, so that a metallic material can be reliably cut.

In the invention of claim 2, the thickness of portions of the left-hand and right-hand set teeth near their end tip portions are approximately equal to the thickness of portions of the left-hand and right-hand set teeth near respective base portions thereof in the invention of claim 1. Accordingly, the left-hand and right-hand set teeth formed in the succeeding tooth approximately have an equal thickness over an entire length thereof and a tooth strength is large.

In other words, sectional shapes of the left-hand and right-hand set teeth are rectangular so that the strength of a tooth edge corner portion is easily maintained and a wear resistance property of the saw blade is improved. An amount of the change in the shape of the saw blade caused by cutting resistance during a heavy cutting is small and a heavy cutting operation can be efficiently performed.

In the invention of claim 3, plural succeeding teeth are formed such that a projecting amount of each of the succeeding teeth is increased as each of heights of the succeeding teeth is reduced. Accordingly, when the material is cut, almost no ghost pattern is caused and no wavy pattern is caused in the cutting and a cutting deviation amount at the cutting time is small so that a stabler cutting operation can be performed.

When the number of succeeding teeth in one group is set to be random, it is not necessary to perform left-hand and right-hand bending operations of the succeeding teeth in accordance with the predetermined rule. Accordingly, the left-hand and right-hand bending operations can be simultaneously performed for a shorter time in comparison with polishing work. Further, cutting resistance can be dispersed to each tooth and reduced.

In the invention of claim 4, $T/2-0.1$ mm$\leq A\leq T/2+0.1$ mm is satisfied when A is set to a size of the succeeding tooth in its parting position and T is set to a body thickness of the succeeding tooth. In the invention of claim 5, inclination angles of the left-hand and right-hand set teeth in the succeeding tooth satisfy $\beta L>0°$ and $\beta R>0°$. In the invention of claim 6, $20°<\theta 90°$ is satisfied when $\theta$ is a parting angle in the succeeding tooth. Accordingly, when the material is cut, no ghost pattern is almost caused and no wavy pattern is caused in the cutting and a cutting deviation amount at the cutting time is small so that a stabler cutting operation can be performed.

That is, in accordance with the present invention, it is possible to effectively restrain generations of the ghost pattern and the wavy pattern tending to be caused when the material is cut by the saw blade. Thus, the cutting operation can be efficiently performed and a cutting operation can be efficiently performed and a cutting accuracy can be improved. Further, life of the saw blade by cutting deviation is greatly improved.

What is claimed is:
1. A saw blade comprising:
a preceding tooth constructed of a straight tooth that is not set in left-hand and right-hand directions, and
a succeeding tooth for cutiting a cutting groove formed by the preceding tooth to enlarge the cutting groove in width,
wherein the succeeding tooth comprises left-hand and right-hand set teeth bent in the left-hand and right-hand directions from a split in an approximately central portion of a tooth upper surface and adjacent cutting edge opening in a tooth thickness direction, wherein a clearance between end tip insides of the left-hand and right-hand set teeth is smaller than the thickness of the preceding tooth.

2. The saw blade as recited in claim 1, wherein the thickness of portions of the left-hand and right-hand set teeth near their end tip portions are approximately equal to the thickness of portions of the left-hand and right-hand set teeth near respective base portions thereof.

3. The saw blade as recited in claim 1, wherein plural succeeding teeth are formed such that a projecting amount of each of the succeeding teeth is increased as each of heights of the succeeding teeth is decreased.

4. The saw blade as recited in claim 1, wherein $T/2-0.1$ mm$\leq A\leq T/2+0.1$ mm is satisfied when A is a size of a parting position of said succeeding tooth, and T is a body thickness of the succeeding tooth.

5. The saw blade as recited in claim 1, wherein it includes succeeding teeth satisfying $\beta L>0°$ and $\beta R>0°$ when $\beta L$ and $\beta R$ are respectively inclination angles of the left-hand and right-hand set teeth in said succeeding tooth on a tooth line.

6. The saw blade as recited in claim 1, wherein $20°\leq\theta\leq 90°$ is satisfied when $\theta$ is a parting angle in said succeeding tooth.

7. The saw blade as recited in claim 2, wherein plural succeeding teeth are formed such that a projecting amount of each of the succeeding teeth is increased as each of heights of the succeeding teeth is decreased.

8. The saw blade as recited in claim 2, wherein $T/2-0.1$ mm$\leq A \leq T/2+0.1$ mm is satisfied when A is a size of a parting position of said succeeding tooth, and T is a body thickness of the succeeding tooth.

9. The saw blade as recited in claim 3 wherein $T/2-0.1$ mm$\leq A \leq T/2+0.1$ mm is satisfied when A is a size of a parting position of said succeeding tooth, and T is a body thickness of the succeeding tooth.

10. The saw blade as recited in claim 2, wherein it includes succeeding teeth satisfying $\beta L>0°$ and $\beta R>0°$ when $\beta L$ and $\beta R$ are respectively inclination angles of the left-hand and right-hand set teeth in said succeeding tooth on a tooth line.

11. The saw blade as recited in claim 3, wherein it includes succeeding teeth satisfying $\beta L>0°$ and $\beta R>0°$ when $\beta L$ and $\beta R$ are respectively inclination angles of the left-hand and right-hand set teeth in said succeeding tooth on a tooth line.

12. The saw blade as recited in claim 4, wherein it includes succeeding teeth satisfying $\beta L>0°$ and $\beta R>0°$ when $\beta L$ and $\beta R$ are respectively inclination angles of the left-hand and right-hand set teeth in said succeeding tooth on a tooth line.

13. The saw blade as recited in claim 2, wherein $20°\leq\theta\leq 90°$ is satisfied when $\theta$ is a parting angle in said succeeding tooth.

14. The saw blade as recited in claim 3, wherein $20°\leq\theta\leq 90°$ satisfied when $\theta$ is a parting angle in said succeeding tooth.

15. The saw blade as recited in claim 4, wherein $20°\leq\theta\leq 90°$ is satisfied when $\theta$ is a parting angle in said succeeding tooth.

16. The saw blade as recited in claim 5, wherein $20°\leq\theta\leq 90°$ is satisfied when $\theta$ is a parting angle in said succeeding tooth.

* * * * *